(12) United States Patent
Vanhercke

(10) Patent No.: US 9,439,357 B2
(45) Date of Patent: Sep. 13, 2016

(54) SQUARE BALERS

(75) Inventor: Olivier Arnel Vanhercke, Gistel (BE)

(73) Assignee: CNH Industrial America LLC, New Holland, PA (US)

( * ) Notice: Subject to any disclaimer, the term of this patent is extended or adjusted under 35 U.S.C. 154(b) by 10 days.

(21) Appl. No.: 14/379,883

(22) PCT Filed: Feb. 21, 2012

(86) PCT No.: PCT/EP2012/052936
§ 371 (c)(1),
(2), (4) Date: Aug. 20, 2014

(87) PCT Pub. No.: WO2013/123976
PCT Pub. Date: Aug. 29, 2013

(65) Prior Publication Data
US 2015/0020699 A1    Jan. 22, 2015

(51) Int. Cl.
*A01F 15/08*    (2006.01)

(52) U.S. Cl.
CPC ....... *A01F 15/0825* (2013.01); *A01F 15/0875* (2013.01); *A01F 2015/0891* (2013.01)

(58) Field of Classification Search
CPC ........... A01F 15/0875; A01F 15/0825; A01F 2015/0891
USPC ................. 100/4, 7, 45, 48, 99, 179, 188 R; 56/341, 343
See application file for complete search history.

(56) References Cited

U.S. PATENT DOCUMENTS

| | | | |
|---|---|---|---|
| 4,742,880 A | 5/1988 | Schrag et al. | |
| 5,540,144 A | 7/1996 | Schrag et al. | |
| 5,742,010 A * | 4/1998 | Griffin | A01F 15/0875 177/145 |
| 6,248,963 B1 * | 6/2001 | Gottlober | A01F 15/0825 177/136 |
| 7,584,696 B2 | 9/2009 | Verhaeghe et al. | |
| 2012/0240797 A1 | 9/2012 | Verhaeghe et al. | |

FOREIGN PATENT DOCUMENTS

| | | |
|---|---|---|
| AU | 201020940 A1 | 2/2011 |
| AU | 2010202940 A1 | 2/2011 |
| DE | 102004027612 A1 | 1/2006 |
| EP | 0771522 A1 | 5/1997 |
| EP | 0974260 A1 | 1/2000 |

* cited by examiner

*Primary Examiner* — Jimmy T Nguyen
(74) *Attorney, Agent, or Firm* — Patrick M. Sheldrake

(57) ABSTRACT

A square baler having a display system for providing the operator with an indication of the weight of completed bales to enable the operator to modify a setting of the baler that affects crop density within the bale in order to achieve a uniform bale weight. In the invention, the display serves to indicate to the operator a rolling average of the weight of a predetermined number of bales last discharged from the baler.

6 Claims, 2 Drawing Sheets

SQUARE BALERS

This application is the US National Stage filing of International Application Serial No. PCT/EP2012/052936 filed on Feb. 21, 2012, the full disclosure of which is hereby incorporated by reference.

FIELD OF THE INVENTION

The present invention relates to agricultural square balers, these being machines for picking up crop material such as hay or straw from the field and forming it into rectangular packages.

BACKGROUND OF THE INVENTION

Conventionally, agricultural square balers comprise a frame that is towed on a pair of wheels over a field for picking up hay, straw or silage grass and feeding such crop material to a baling chamber in which it is compressed to parallelepiped packages under action of a plunger which reciprocates inside the baling chamber. When the packages have reached a predetermined length a tying mechanism is operated to encircle the completed package with a plurality of strands to form a finished bale which will be ejected out of the baler.

As the outlet of the baling chamber is at a substantial height above the field and positioned in a certain angle, there is a risk of the bales being damaged by their fall from the baling chamber, e.g. because the impact breaks some or all of the strands, or because no proper bale drop is ensured, especially with short bales, which end up standing on end when the bale is dropped. Commonly this problem has been solved by providing a guide or a slide at the exit of the baling chamber for reducing the height from which the bale is released onto the field and/or giving a wanted orientation to the bale. In the art, such apparatus usually is referred to as "bale chute" and examples can be found in WO96/29195 and EP-A-0771522.

EP-0974260 discloses an agricultural baler having a bale chute which comprises a rear portion that is movable between an upper, bale sustaining, position and a lower, bale discharging, position.

In EP-0974260, the rear portion is pivotable about an axis located at its leading edge so that, as it pivots, its trailing edge is lowered closer to the ground to allow the formed bale to slide off the chute and to be lowered gently onto the ground. In this manner the rear portion can be lowered during the time interval of the actual discharge operation only. During the remainder of the baler operation, the rear portion is kept at a level sufficiently high for precluding collision with the ground.

It is has been proposed in EP1935232 to weigh each bale as it is being discharged from the bale chute. Weighing each bale can enable the farmer to assess the yield of a field and can enable a contractor to charge by the weight of the baled material rather than the number of bales.

In EP1935232, the bale chute comprises a rear portion that is pivotable about a horizontal axis to allow each bale to be lowered onto the ground without the bale toppling onto its end as it leaves the bale chute and means for weighing each bale while the whole of its weight is supported by the rear portion of the bale chute. Other arrangements for measuring weight have also been proposed and may be used in implementing the present invention though they are not deemed as accurate as the weighing system of EP1935232.

The facility to display the weight of bales on a monitor visible by the baler operator can be used by the operator to achieve a more uniform crop density. As bales are tied when they reach a predetermined length, they should all have the same density if they have same weight.

Hitherto, the weight of the last bale to be weighed has been displayed to the operator alongside the desired weight. As the operator can vary certain operating parameters in order to vary the crop density, it is possible for the operator to increase or decrease the density to correct for the difference between the measured and the desired weight of the bales.

A problem is however experienced if the crop density is modified by the operator in dependence upon the weight of the last bale discharged from the baler. This is because bales are subject to random variation in their weight even if no modification is made to the parameters affecting the crop density.

SUMMARY OF THE INVENTION

With a view to mitigating the foregoing disadvantage, the present invention provides a square baler having a display system for providing the operator with an indication of the weight of completed bales to enable the operator to modify a setting of the baler that affects crop density within the bale in order to achieve a uniform bale weight, characterized in that the display system is configured to indicate to the operator a rolling average of the weight of a predetermined number of bales last discharged from the baler, and in that the averaging is weighted so as to attach greater significance to the more recently completed bales.

The predetermined number may be between three and seven, five being preferred.

By displaying the weighted average of several bales, the invention avoids the problem caused by random variations in weight between bales. The operator will only be prompted to take measures to change the crop density if there is a consistent or systematic variation between the measured and the desired weights of the completed bales.

The weighting of the average enables the operator to determine more quickly if an implemented change in crop density has achieved the desired effect on the bale weight.

It is important to avoid excessive tampering with the settings and to allow sufficient time for an implemented change to have an effect before any further changes are made to the settings.

With this in mind, it is desirable take steps to prevent or deter the operator from making changes to the setting before changes already made have had time to have an effect. Such steps may include suppression of the average weight display for some time after a setting has been changed. Instead of suppressing the display, it may be modified in colour or brightness to indicate to the operator that a change in settings is still taking effect and the displayed average is not a reliable indicator of the bale weight matching the current settings.

BRIEF DESCRIPTION OF THE DRAWINGS

The invention will now be described further, by way of example, with reference to the accompanying drawing in which.

DESCRIPTION OF THE PREFERRED EMBODIMENT

Figure 1:
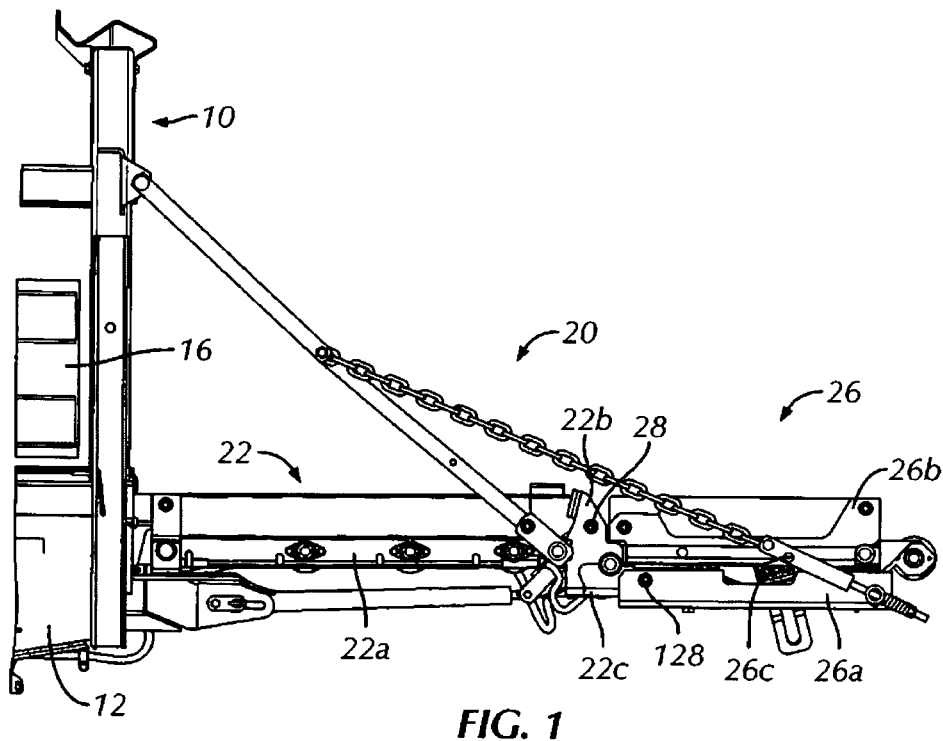
FIG. 1 shows a square baler according to an embodiment of the invention.
Figure 2:
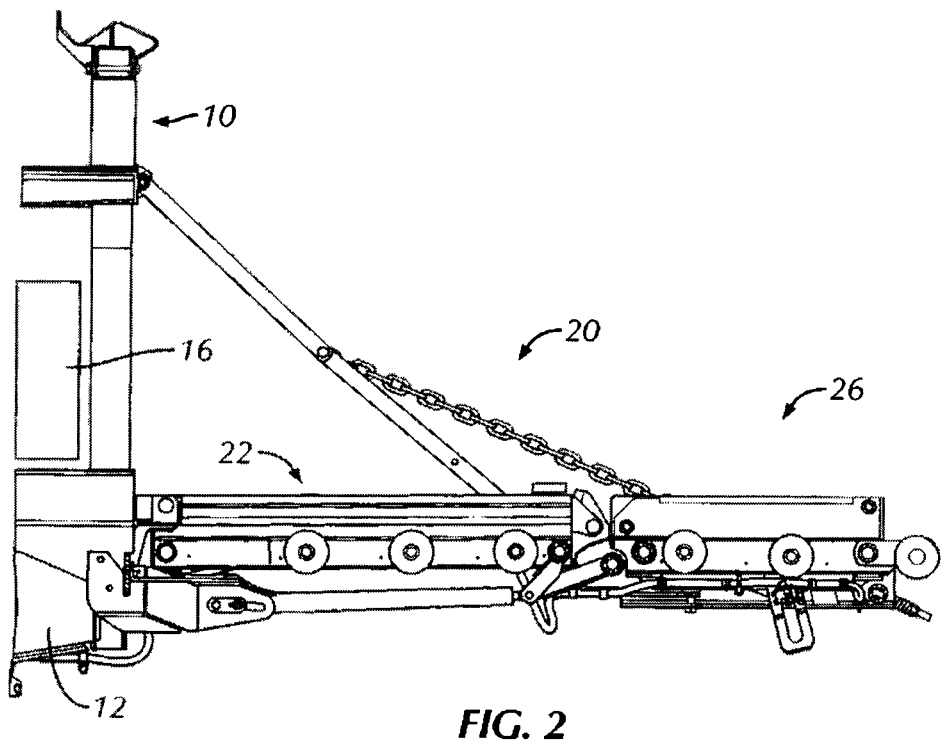
FIG. 2 shows a section of the square baler according to FIG. 1.

FIGS. 1 and 2 show a square baler 10 according to the invention. The main structural components correspond to the baler described in EP1935232, and comprise a baler frame 12 which is preferably configured to be hitched on to a towing tractor (not shown). Square bales are formed by a reciprocating plunger in a baling chamber 16, the bales are then tied and discharged from the rear end of the baling chamber onto the bale chute 20. The bale chute is formed of two portions: front portion 22 and rear portion 26. The front portion 22 comprises a first portion 22a that is pivotally attached to the baler frame 12 and a second portion that forms a frame made up of vertical plates 22b and a horizontal plate 22c. The second portion 22b, 22c is pivotally attached to the first portion 22a by means of an axis 28 that is only used to move the rear portion of the chute into the transport position as described more in detail in EP1935232. The rear portion 26 comprises a pivot frame 26a, which pivots about an axis 128 situated below the support surface of the front portion 22a and rearwards from the leading edge of the rear portion 26, and a weighing table 26b, which is supported on the pivot frame 26a by means of load beams 26c. The rear portion 26, that is pivotally mounted to the front portion 22 in this way pivots about a horizontal axis 128, perpendicular to the travelling direction, between an upper, bale sustaining, position and a lowered, bale discharging position to allow each bale to be lowered onto the ground without the bale toppling onto its end as it leaves the bale chute 20. The position of the pivot axis 128 provides a clear separation of the bale once the weighing table 26b pivots in the bale discharging position, so that the bale may be weighed during this suitable weighing timespan. The weighing table is formed of a roller conveyor as more clearly visible in FIG. 2.

Figure 3:
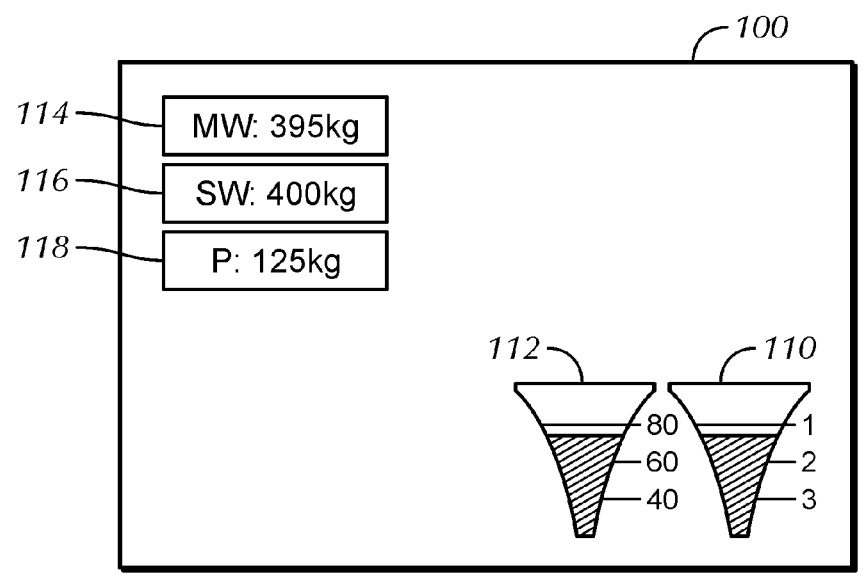
FIG. 3 shows a visual display serving as the operator interface in a baler.

The visual display 100 shown in FIG. 3 shows only the control parameters that are indicated to the operator in implementing the present invention. In particular, the display has a window 114 in which the mean weight of the last five bales is displayed and a window 116 indicating the desired or set weight. In a further window 118, there is displayed the hydraulic pressure of the compression system.

The trumpet-like scale 112 indicates the current pressure applied to compress the bales, as measured for example by the reaction force on the gearbox driving the compression plunger of the baling chamber, as percentage of the maximum available pressure. The other scale 110 visually displays the capacity of the intake chute, measured as the number of cycles of the stuffer performed during each cycle of the plunger. Other parameters may be displayed if desired, such as the baler speed, or the cumulative weight of all bales gathered in a job.

From a knowledge of the weight of the last bale, an operator would know how to set the various control parameter to optimise the efficiency of the baler (measured by the weight of crop baled in a given time) and to achieve the desired bale weight.

An increase in the plunger load will clearly increase packing density and therefore increase bale weight. It is less simple to predict the effect on the bale weight of varying the crop density in the intake passage at which the sensor in the intake passage will initiate a stuffer cycle. The reason for this is that the uploading of slices into the square baling chamber cannot be carried out at will but must be synchronised with the movement of the reciprocating plunger.

To elaborate on this point, the plunger in the baling chamber is in constant reciprocating motion. During each forward stroke, it pushes crop present in the baling chamber towards the discharge end and, during its return stroke, it separates from the crop leaving space for a new slice to be uploaded from the intake passage by the stuffer. If the stuffer attempts to upload a slice while the plunger is not near its bottom dead centre at the end of a return stroke then the entrance to the square baling chamber will be obstructed either by the crop or by the plunger.

Thus, when the crop in the intake passage reaches the density required to initiate a stuffer cycle, that cycle is not commenced immediately but it is timed to ensure that the slice is transferred into the baling chamber when the plunger is next near its bottom dead centre position. Consequently, the pick-up mechanism continues to increase the crop density in the intake passage while waiting for the plunger to reach the appropriate position in its cycle, resulting in the density of the slice uploaded into the baling chamber being greater than that set by the operator.

In practice, the plunger in the baling chamber may perform more than one cycle while the desired mass of crop is being accumulated in the intake passage. The intake passage capacity referred to above and displayed to the operator is measured in terms of the number of cycles of the plunger required for the density in the intake passage to reach the value at which the associated sensor initiates a stuffer cycle.

The intake passage capacity need not be a whole number of plunger cycles. Ideally, the time taken to achieve the crop density level chosen to initiate a stuffer cycle should be slightly less than a whole number multiple of the plunger cycle. In this way, after having been tripped, the stuffer does not have to wait long for the plunger to reach a suitable position in the baling chamber to permit the uploading of the slice to be commenced. If the tripping is not well timed, it may be necessary for the stuffer to wait for nearly a whole cycle of the plunger to be completed before uploading can be commenced.

From this explanation, it will be clear that the pressure setting of the sensor in the intake passage at which a stuffer cycle is tripped does not linearly correlate with the density of the formed bales. Because the plunger oscillates with a constant frequency, it will also be clear that the speed of the baler has to be matched to the setting of the pressure sensor in the intake passage for the stuffer cycles to be correctly synchronised with plunger cycles.

The estimation of bale weight is complicated further by the fact that the degree to which a slice is compressed by the plunger in the baling chamber varies with the thickness of the slice, the plunger being more successful at compressing thinner slices than thicker ones. An increase in the mass of each slice does not therefore result in an increase in bale weight, more probably it will result in a bale of reduced weight and poorer shape, but the quantized uploading of crop into the baling chamber does affect the accuracy to which the weight of any given bale can be set.

From the above explanation, it will be understood that there is an unavoidable variation in weight from one completed bale to the next. This variation makes it still more difficult for the operator to set the various parameters affecting the bale density. For example, the operator may take appropriate steps to correct a weight deficiency by increasing the bale density but the weight of the following bale may still be deficient on a account of the variation described above. Believing that the action already taken may not be sufficient, the operator will then take steps to increase the bale density still further, causing the bale weight to overshoot the desired weight.

In other words, the variation between the weight of consecutively formed bales imposes a random variation on the error signal that is used by the operator as a feedback signal to set the optimum crop density, thus making the task more difficult for the operator.

With a view to mitigating this problem, the present invention proposes providing the operator with an indication of the weighted rolling average of the weight of a predetermined number of bales last discharged from the baler. It is preferred to display the average weight of the previous five bales.

Because the displayed weight is an average taken over several bales, it will be less prone to fluctuation.

If the displayed weight is simply averaged over the last five preceding bales, the benefit of averaging the random error will not be achieved if the operator were to make adjustments after every bale is discharged.

To explain this point in more detail, the average weight of five bales is given by $$(W_1+W_2+W_3+W_4+W_5)/5$$

After making a correction to the density and producing a bale of weight $W_6$, the displayed average weight will be $$(W_2+W_3+W_4+W_5+W_6)/5$$

The difference between these two averages is $$(W_6-W_1)/5$$

As a result, all that has been achieved is to compare the weight of the last bale with the weight of the bale discharged five bales previously.

To avoid this problem, embodiments of the invention employ a weighted average that attaches more significance to the weight of the later discharged bales. Thus the weighted average may be taken as $$(K_1 \cdot W_1+K_2 \cdot W_2+K_3 \cdot W_3+K_4 \cdot W_4+K_5 \cdot W_5)/(K_1+K_2+K_3+K_4+K_5)$$

where $K_1$ to $K_n$ are progressively increasing weighting factors.

In addition, to displaying a weighted average, it is possible to mitigate the problem described above by allowing time for a requested change in density to take effect and to be reflected accurately in the displayed average weight before any further change is requested.

While it would be possible to impose a minimum limit on the number of bales produced before a further change in settings can be requested, this is not preferred. Instead, it is preferred to warn the operator in any convenient manner that the last change in settings may not yet be reflected in the displayed average weight. For example, the average weight display may be suppressed entirely or it may be displayed in a different brightness (greyed out) or a different colour to warn the operator to wait before making any further adjustment to the settings.

The invention claimed is:

1. A square baler comprising:
a display system that provides an operator of the square baler with a weight for completed bales, and
an indication as part of the display system, the indication enables modification for a setting of the baler that affects a crop density within the bale in order to achieve a uniform bale weight, wherein the indication serves to indicate to the operator a measured average bale weight representative of a rolling average for a weight of a predetermined number of bales last discharged from the baler, wherein in determining the measured average bale weight weighting factors are applied to respective weights of the predetermined numbers of bales while averaging, and wherein the weighting factors vary so as to attach greater significance to the more recently completed bales.

2. The square baler of claim 1, wherein the predetermined number of bales is within a range of three to seven.

3. The square baler of claim 1, wherein the displayed average weight is that of the last five bales.

4. A square baler comprising:
a display system that provides an operator of the square baler with a weight for completed bales, and
an indication as part of the display system, the indication enables modification for a setting of the baler that affects a crop density within the bale in order to achieve a uniform bale weight, wherein the indication serves to indicate to the operator a measured average bale weight representative of a rolling average for a weight of a predetermined number of bales last discharged from the baler, wherein in determining the measured average bale weight weighting factors are applied to respective weights of the predetermined numbers of bales while averaging, the weighting factors vary so as to attach greater significance to the more recently completed bales;
wherein upon a modification of the setting, the display system deters a further change in settings before this change has had sufficient time to affect the measured average bale weight.

5. The square baler of claim 4, wherein the display of average bale weight is suppressed for a given number of bales following a change in the settings of the baler affecting the crop density in the formed bales.

6. The square baler of claim 4, wherein a the average bale weight is modified in brightness or colour for a given number of bales following a change in the settings of the baler affecting the crop density in the formed bales.

* * * * *